(12) United States Patent
Heiner et al.

(10) Patent No.: US 7,257,590 B2
(45) Date of Patent: Aug. 14, 2007

(54) METHOD AND SYSTEM FOR CLASSIFYING BINARY STRINGS

(75) Inventors: Andreas Heiner, Espoo (FI); Carl Eklund, Helsinki (FI)

(73) Assignee: Nokia Corporation, Espoo (FI)

( * ) Notice: Subject to any disclaimer, the term of this patent is extended or adjusted under 35 U.S.C. 154(b) by 282 days.

(21) Appl. No.: 10/488,180

(22) PCT Filed: Aug. 29, 2001

(86) PCT No.: PCT/EP01/09960

§ 371 (c)(1),
(2), (4) Date: Apr. 13, 2004

(87) PCT Pub. No.: WO03/021906

PCT Pub. Date: Mar. 13, 2003

(65) Prior Publication Data

US 2004/0243563 A1    Dec. 2, 2004

(51) Int. Cl.
*G06F 17/00* (2006.01)
*G06F 7/00* (2006.01)
(52) U.S. Cl. .................. 707/101; 707/1; 707/3
(58) Field of Classification Search ........ 707/101, 707/1, 3, 7; 370/389
See application file for complete search history.

(56) References Cited

U.S. PATENT DOCUMENTS 5,574,910 A   11/1996   Bialkowski et al.
6,754,662 B1 *  6/2004  Li .......................... 707/101
6,859,455 B1 *  2/2005  Yazdani et al. ............ 370/392
2002/0023089 A1 *  2/2002  Woo ......................... 707/101
2002/0152209 A1 *  10/2002  Merugu et al. ............ 707/7

FOREIGN PATENT DOCUMENTS

WO    WO 00/08817    2/2000
WO    WO 00/70832    11/2000

* cited by examiner

*Primary Examiner*—Sam Rimell
*Assistant Examiner*—Rezwanul Mahmood
(74) *Attorney, Agent, or Firm*—Squire, Sanders & Dempsey L.L.P.

(57) ABSTRACT

The present invention relates to a method and network element for classification of bit strings such as data packets on a per-flow basis, wherein a plurality of classification fields are searched for in respective search trees based on a matching procedure in which an index value is obtained in a leaf node of a search tree for each classification field. Index values obtained in said searching step are used to derive a policy to be applied to said data packet, wherein the number of index values is reduced by combining intermediate results of the searching step or the deriving step. Thereby, computational efficiency can be improved and memory requirements reduced.

22 Claims, 5 Drawing Sheets

METHOD AND SYSTEM FOR CLASSIFYING BINARY STRINGS

FIELD OF THE INVENTION

The present invention relates to a method and system for classification of binary strings, such as Internet Protocol (IP) packets or addresses or any other bit strings or parts thereof having a specific meaning.

BACKGROUND OF THE INVENTION

The invention presented is motivated by the twin goals of increasing the capacity and the flexibility of the Internet. The Internet is comprised of packet-processing nodes, called routers, that route packets towards their destinations, and physical links that transport packets from one router to another. Owing to advances in optical technologies, such as Wavelength Division Multiplexing, the data rates of links have increased rapidly over the years. However, routers have failed to keep up with this pace because they must perform expensive per-packet processing operations. Every router is required to perform a forwarding decision on an incoming packet to determine the packet's next-hop router. This is achieved by looking up the destination address of the incoming packet in a forwarding table. Besides increased packet arrival rates because of higher speed links, the complexity of the forwarding lookup mechanism and the large size of forwarding tables have made routing lookups a bottleneck in the routers. The invention attempts to overcome this bottleneck.

The invention concerns itself with increasing the flexibility and functionality of the Internet. Traditionally, the Internet provides only a "best-effort" service, treating all packets going to the same destination identically, and servicing them in a first-come-first-served manner. However, in differentiated service models, Internet Service Providers are seeking ways to provide differentiated or value-added services (on the same network infrastructure) to different users and/or user applications based on their different requirements and expectations of quality from the Internet, i.e. Service Level Agreements (SLAs). For this, routers need to have the capability to distinguish and isolate traffic belonging to different users and user flows, where a user can be a single individual or a group of individuals with common denominator (e.g., all people in a company), and user flow can be the data associated with one or a group of applications with a common denominator (e.g., voice, web browsing, e-mail) of a user. The ability to classify each incoming packet to determine the flow it belongs to is called packet classification, and could be based on an arbitrary number of fields, i.e. classification fields, in the packet header.

As mentioned, routers may optionally classify packets into flows for special processing. In the following, it is described why some routers are flow-aware, and how they use packet classification to recognize flows. It is also provided a brief overview of the architecture of flow-aware routers. Then, the background leading to the formal definition of the packet classification problem is discussed.

One main reason for the existence of flow-aware routers stems from an ISP's (ISP=Internet Service Provider) desire to have the capability of providing value-added services to its users. As mentioned, the Internet provides only a "best-effort" service, treating all packets at every forwarding point in the network identically, and servicing them in a first-come-first-served manner. However, the rapid growth of the Internet has caused increasing congestion and packet loss at intermediate routers. As a result, some users are willing to pay a premium price in return for better service for all or a group of applications from the network. To maximize their revenue, the ISPs also wish to provide different levels of service at different prices to users based on their requirements, while still deploying one common network infrastructure. In order to provide differentiated services, routers require additional mechanisms. These optional mechanisms—admission control, conditioning (metering, marking, shaping, and policing), resource reservation, queue management and fair scheduling (such as weighted fair queueing) or any other mechanism deemed suitable in any combination of a set or subset of these—require, first of all, the capability to distinguish and isolate traffic belonging to different user(groups) and/or applications based on service agreements negotiated between the ISP and its customer. This has led to demand for flow-aware routers that negotiate these service agreements, express them in terms of rules or policies configured on incoming packets, and isolate incoming traffic according to these rules. The functionality that specifies the policy that applies to a packet (e.g., to which flow a packet belongs) is a packet classifier (flow classifier) or simply classifier. The collection of policies is the network policy. Once classified, the policy (action to be taken) is executed. So a policy consists of a definition part (policy definition, implemented in the classifier) and an action (policy action). Each policy specifies a flow that a packet may belong to based on some criteria on the contents of the packet. This does not have to be limited to the header. E.g., for firewall functionality the system administrator also wants to look into the user data to check on the existence of viruses (typical user data). All packets belonging to the same flow are treated in a similar manner. The identified flow of an incoming packet specifies an action to be applied to the packet. For example, a firewall router may carry out the action of either denying or allowing access to a protected network. The determination of this action is called packet classification—the capability of routers to identify the action associated with the "best" policy an incoming packet matches. Packet classification allows ISPs to differentiate from their competition and gain additional revenue by providing different value-added services to different customers.

A flow-aware router is able to check for every incoming packet if it belongs to a flow for which the action is already determined. This is done by checking a bit pattern of a predetermined number ($N_{fld}$) of classification fields (in IPv6: flow label or any field or combination thereof). The router checks if the bit pattern is present in a so-called flow table (this can be done via e.g. hashing), and if so, executes the actions specified for that flow. If the bit pattern is not found in the flow table, normal classification occurs, and optionally the packet bit pattern may be put in the flow table, together with the policy action to be applied for this flow.

Packet classification enables a number of additional, non-best-effort network services other than the provisioning of value-added services. One of the well-known applications of packet classification is a firewall. Other network services that require packet classification include policy-based routing, traffic rate-limiting and policing, traffic shaping, and billing. In each case, it is necessary to determine which flow an arriving packet belongs to so as to determine—for example—whether to forward or filter it, where to forward it to, what type of service it should receive, or how much should be charged for transporting it. With the introduction of QoS (Quality of Service) in networks, classification of IP-packets in access routers has become more important than ever. In the differentiated service model, the value for the differentiated service code point (DSCP) in IP packets is based on the classification of the flow in the access points. Similarly, in a Multi-Protocol Label-Switched (MPLS) domain the packet flows have to be assigned to a specific Label-Switched Path (LSP) at the access point. Hence efficient classification methods are of high importance to router vendors.

With the above background, the problem of packet classification can be described:

In practice, a policy may have several components, wherein a policy component is not a general regular expression—often limited by syntax to a simple address/mask or operator/number(s) specification. In an address/mask specification, a "0" at bit position x in the mask denotes that the corresponding bit in the address is a "don't care" bit. Similarly, a "1" at bit position x in the mask denotes that the corresponding bit in the address is a significant bit. For instance, the first and third most significant bytes in a packet field matching the specification 171.4.3.4/255.0.255.0 must be equal to 171 and 3, respectively, while the second and fourth bytes can have any value, due to the fact that the mask bits of the first and third mask bytes are all set to "1" (i.e. "255" corresponds to "11111111") and the mask bits of the second and fourth mask bytes are all set to "0". Examples of operator/number(s) specifications are e.g. 1232 and range 34-9339, which specify that the matching field value of an incoming packet must be equal to 1232 in the former specification and can have any value between 34 and 9339 (both inclusive) in the latter specification. Note that a route-prefix of a length l can be specified as an address/mask pair where the mask is contiguous—i.e., all bits with value "1" appear to the left of (i.e., are more significant than) bits with value 0 in the mask. For instance, the mask for an 8-bit prefix is 255.0.0.0. A route-prefix of length l can also be specified as a range of width equal to $2^t$ where t=32-l. In fact, most of the commonly occurring specifications in practice can be viewed as range specifications.

In the following the background of search trees shall be briefly described:

A radix trie, or simply a trie (the name trie comes from retrieval, but is pronounced "try") is a binary tree that has labeled branches, and that is traversed during a search operation using individual bits of the search key. The left branch of a node is labeled "0" and the right-branch is labeled "1". A node, v, represents a bit-string formed by concatenating the labels of all branches in the path from the root node to v. A prefix, p, is stored in the node that represents the bit-string p. For example, the prefix 0* is stored in the left child of the root node. A trie for W-bit prefixes has a maximum depth of W nodes. The longest prefix search operation on a given destination address proceeds bitwise starting from the root node of the trie. The left (right) branch of the root node is taken if the first bit of the address is "0" ("1"). The remaining bits of the address determine the path of traversal in a similar manner. The search algorithm keeps track of the prefix encountered most recently on the path. When the search ends at a null pointer, this most recently encountered prefix is the longest prefix matching the key.

Therefore, finding the longest matching prefix using a trie takes W memory accesses in the worst case, i.e., has time complexity. The insertion operation proceeds by using the same bit-by-bit traversal algorithm as above. Branches and internal nodes that do not already exist in the trie are created as the trie is traversed from the root node to the node representing the new prefix. Hence, insertion of a new prefix can lead to the addition of at most other trie nodes. The storage complexity of a W-bit trie with N prefixes is thus O(NW). A significant amount of storage space is wasted in such a trie in the form of pointers that are null, and that are on chains—paths with 1-degree nodes, i.e., that have only one child.

A Patricia tree (Patricia is an abbreviation for "Practical Algorithm To Retrieve Information Coded In Alphanumeric", in the following referred as to "Patricia") is a variation of a trie data structure, with the difference that it has no 1-degree nodes. Each chain is compressed to a single node in a Patricia tree. Hence, the traversal algorithm may not necessarily inspect all bits of the address consecutively, skipping over bits that formed part of the label of some previous trie chain. Each node now stores an additional field denoting the bit-position in the address that determines the next branch to be taken at this node. The original Patricia tree (see D. R. Morrison. "PATRICIA—practical algorithm to retrieve information coded in alphanumeric," Journal of the ACM, Vol. 15, No. 14, pages 514-34, October 1968) did not have support for prefixes.

However, prefixes can be concatenated with trailing zeros and added to a Patricia tree. Since a Patricia tree is a complete binary tree (i.e., has nodes of degree either 0 or 2), it has N exactly external nodes (leaves) and N−1 internal nodes. The space complexity of a Patricia tree is thus O(N). Prefixes are stored in the leaves of a Patricia tree. A leaf node may have to keep a linear list of prefixes, because prefixes are concatenated with trailing zeroes. The lookup algorithm descends the tree from the root node to a leaf node similar to that in a trie. At each node, it probes the address for the bit indicated by the bit-position field in the node. The value of this bit determines the branch to be taken out of the node. When the algorithm reaches a leaf, it attempts to match the address with the prefix stored at the leaf. This prefix is the desired answer if a match is found. Otherwise, the algorithm has to recursively backtrack and continue the search in the other branch of this leaf's parent node. Hence, the lookup complexity in a Patricia tree is quite high, and can reach $O(W^2)$ in the worst case.

A bit pattern of d fields has a total length of $W(1)+W(2) \ldots W(d)=W$. We now have d tries. Prefix w(j) is now defined by bits $W(1)+W(2)+ \ldots +W(j-1)+1$ to $W(1)+W(2)+ \ldots +W(j-1)+W(j)$, and the depth of trie j is W(j). The algorithm searches for a match in each of the trees in increasing order of prefix-lengths. For a Longest Prefix Match (LPM) of a string of w bit, $w=W(1)+W(2)+ \ldots +W(k-1)+k<W(k)$, it requires an exact match for the first k−1 bit strings over the full length W(j) (j=1 . . . k−1) and an LPM for trie W(k). The first match found for all k tries yields the longest prefix matching the given address. For an Exact Match (EM) of a string of w=W bits, it requires and exact match for all d tries. Since one exact match operation on a Patricia tree of length W(j) takes O(W(j)) time, the complete matching operation has complexity $O(W^2(1))+O(W^2(2)) \ldots O(W^2(d))<=O(W^2)$ (sequential execution) or $O(max(W^2(j)))$ (parallel execution)

It should be pointed out that the method is not limited to Patricia tree data structure; other forms of binary trie structures such as the level-compressed trie can be used as well (Andersson and Nilsson, Information Processing Letters, 46:295-300, 1993; Nilsson and Tikkanen, 2nd Workshop on Algorithm Engineering (WAE '98), 1998). The main requirement is that the trie-structure allows for backtracking if a LPM is required (this is not required for $RM^\dagger$ and EM).

Moreover, wherever an exact match is required, other algorithms than trie searches (linear search, hashing) can be used as well.

SUMMARY OF THE INVENTION

It is an object of this invention to design efficient packet classification methods to enable routers to perform fast packet classification on multiple fields.

This object is achieved by a method according to claim 1 or 17.

Advantageous developments are defined in the dependent claims.

The method according to the invention is easy to implement in hardware, and contains several improvements that reduce memory requirements and increase computational efficiency. The improvements are based on using as much previous and future knowledge of the possible filters, i.e. searching is made context-sensitive. The improvements are
1) Discontiguous value ranges $x_1$ and $x_2$ normally require two policies $P_1$ and $P_2$ that may refer to the same action $P_{act}$. In the present formulation the policies $P_1$ and $P_2$ can be written as one policy $P_{act}(x_1 \text{ OR } x_2)$. The method can be applied for all data sets U that co-determine the exact policy. The method reduces memory requirements by merging filters, wherein a filter F(x, y, z) classifies a packet and associates it with a policy P(x, y, z).
2) Policies P that contain wild cards, i.e. $P(x_1,*)$ normally require n identical policies $P(x_1,y_1)$, $P(x_1,y_2)$ ... $P(x_1,y_n)$ as there may be another policy $P(x_2,y_1)$. The method is able to store all policies $P(x_1,y_1)$, $P(x_1,y_2)$ ... $P(x_1,y_n)$ in one table entry, and does not parse the data set y at all, i.e. certain parsing phrases can be skipped. The same applies for policies $P(*,y_1)$ or policies $P(x_1,*,z_1)$ in one table entry. This approach improves computational efficiency and reduces memory requirements.
3) To efficiently search combinations $P(x_1,y_1,z_1)$ lists are maintained in $y_1$ containing the value $x_1$, and $z_1$ contains the tuplet $(x_1,y_1)$. If there is a policy $P(x1,y1,z_2)$ and $z_1$ is a descendant of $z_2$, it follows $P(x1,y1,z_1)=P(x1,y1,z_2)$. The tuplet $(x_1,y_1)$ is not stored in $z_1$, but the policy is derived from backtracking to $z_2$ that contains the tuplet $(x_1,y_1)$. This is modestly slower, but memory requirements are considerably lower. Defining a special bit in the data, policies P(x1,y1,z2) and P(x1,y2,z1) can be stored in one table entry P(x1,(y1 OR y2, z1) OR (y1, z1 OR z2)), even for EM and RM. For example, the protocol-dport-sport ranges (TCP,80 or 8080,*) (TCP,*,80 or 8080) all refer to HTTP flows. An additional property has been developed. It states:
   i) To reduce the size of lists, flags are carried in the lists indicating if a field should be considered in the comparison or not. If policy P(x1,y1,z2) is different from P(x1,y1,*)=P(x1,*,z1), the following applies. The list belonging to y=y1 contains the entry x1 plus a flag indicating that parsing z can be skipped. If y<>y1, z has to be parsed. If z=z1, z1 would contain a list containing all tuples (x1,y<>y1). However, the list belonging to z1 has the entry (x1,0x0) with the switch indicating that the value for y is irrelevant. Hence policies can be efficiently represented.
   ii) In case backtracking is not allowed (range matches, exact matches), policies of the type P(x1,*,z1) all have to be implemented in case there is a policy P(x1,y1,z2). If x=x1, a partial result is defined.
4) Although the method is described for sequential implementation, parallel implementations are also possible without changing the data structure.

The invention provides a new variant for Patricia tree and an optimized information structure. The new method provides a search method with several wild cards and regular expressions in traditional Patricia trees which is not possible in the prior art methods. Moreover, the inventive method minimizes the amount of needed searches and keeps the memory requirements reasonable, although still providing all needed functions. The data structure and the method that enable these optimizations are given below. The concept can be implemented in sequential or parallel codes.

BRIEF DESCRIPTION OF THE DRAWINGS

In the following, the present invention will be described in greater detail based on preferred embodiments partly with reference to the accompanying drawing figures, in which.

DESCRIPTION OF THE PREFERRED EMBODIMENT

Figure 1:
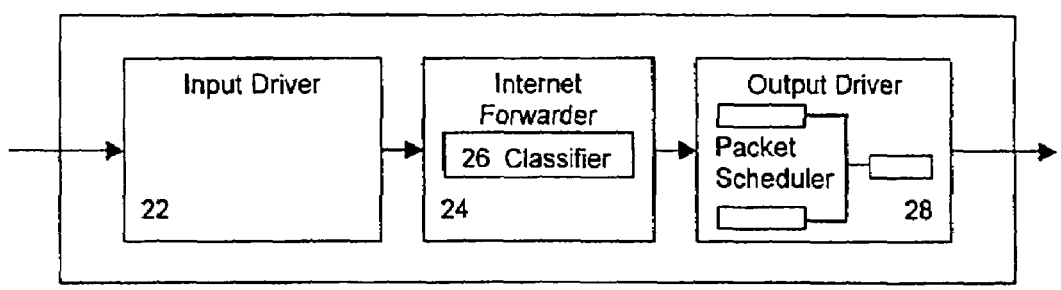
FIG. 1 shows a schematic block diagram of a forwarding path of an IP router in which the present invention can be implemented.

The preferred embodiment of the present invention will now be described based on a classification example which may be implemented e.g. in the forwarding path of an IP router, as shown in FIG. 1. In this example, each of $N_{fld}$ classification fields (e.g. $N_{fld}$=5 in case of simple IP packet classification) are searched for in the appropriate tree of each field, either by an exact or range match (protocol, ports) or longest prefix match. A Range Match (RM) is a match of a bit string on a number of contiguous, ordered bitstrings. E.g. let the range R1 be defined as 10-18 (decimal), there are no other ranges defined that are overlapping ranges such as 10-12. A possible search procedure for a RM is an LPM without backtracking. Each matching procedure for the field value s ends in a leaf $S_n$ (s is member of set $s_n$, $s \in s_n$) with an index ind($s_n$) of $B_{ind}$ bit.

As described in the IETF specification RFC 1633, an IP router may have two broad functional divisions: the forwarding path and a background code. The forwarding path is executed for every IP packet and therefore has to be highly optimized. The forwarding path may be divided into three sections: input driver 22, Internet forwarder 24, and output driver 28. The Internet forwarder 24 interprets the Internet working protocol header appropriate to the protocol suite, e.g. The IP header for TCP/IP, or the CLNP header for OSI. For each packet, the Internet forwarder 24 executes a suite-dependent classification in a classifier 26 and then passes the packet and its class to the output driver 28. The output driver 28 implements a packet scheduler which is largely independent of the detailed mechanics of the interface. The background code is simply loaded into a router memory and executed by a general-purpose central processing unit (CPU). These background routines create data structures used for controlling the forwarding path. If an admission control function accepts a new request, appropriate changes are made to databases of the classifier 26 and the packet scheduler e.g. to implement the desired quality of service (QoS).

The general idea of the classification procedure according to the present invention is to reduce the number of indices by mapping intermediate results as much as possible onto one value using knowledge of previous searches. This is equivalent with after every step reducing the full set of possible policies as much as possible. Future knowledge is incorporated as much as possible using logicals. The classification algorithm described below is designed to optimize speed and reduce memory requirements as much as possible. However, since these requirements are often confliction, a trade-off has to be made in the design phase. Moreover, the algorithm assumes that another algorithm compatible with the search algorithm has generated the appropriate tree. The description of the tree generation algorithm will be omitted here for reasons of simplicity. To find the policy that applies to a packet characterized by the five classification fields (u,v,w,x,y) a combination of the following procedures can be applied.

In a concatenation and hashing procedure, all indices $ind(u_i)$, $ind(v_j)$, $ind(w_k)$, $ind(x_l)$, and $ind(y_m)$ are concatenated to one tuple $(ind(u_i),ind(v_j),ind(w_k),ind(x_l),ind(y_m))$ of $N_{fld}$ indices. One tuple is $N_{fld} \times B_{ind}$ bit long and is later denoted as Index Key Register (IKR), and the associated policy is found via hashing of the tuple. Any standard hashing procedure can be used. This method is very fast, but has high memory requirements due to the large redundancy (in general there are more field combinations than policies) and the fact that for efficient hashing a sparse hash table is required. Instead of hashing any regular tree search (binary, Patricia) of the tuple in a predefined final tree can be used as well.

In a subsequent mapping and concatenation procedure, only one entry is required if the leafs $u_1$ and $u_2$ in the tree U resulting in the same policy for each set tuple $(v_j,w_k,x_l,y_m)$ of the other fields $(P(u_1,v_j,w_k,x_l,y_m)=P(u_2, v_j,w_k,x_l,y_m))$ are given the same index value $ind(u_1)$. This is equivalent with $P(u_1 \text{ OR } u_2,v_j,w_k,x_l,y_m)$.

In the following, an exact match function for mapping and matching during the search is described.

If a policy exists for the tuple $(u \in u_1, v \in v_1)$, store the index (tuple) $ind(u_1)$ during the build-up in a list attached to leaf $v_1$ with index $ind(v_1)$. If the search for the field v ends in leaf $v_1$, search for the tuple $ind(u_1)$ in the list of $v_1$. If found, the subset of all policies $(u_1,v_1,*,*,*)$ is found, and the result of the second search is the tuple $(ind(u_1),ind(v_1))$. Any standard list search method can be used, as well as an exact match procedure using a patricia trie structure instead of a list. This procedure can be applied for all subsequent trees that are searched. For example, if there exists a policy for the set $(u_1,v_1,w_1)$ the tuple $(ind(u_1),ind(v_1))$ is stored in the leaf of $w_1$ with tuple $ind(w_1)$. The search for the third field w ends in leaf $w_1$, and the tuple $(ind(u_1),ind(v_1))$ is searched in the list attached to $w_1$. If found, the result of the first three searches is the tuple $(ind(u_1),ind(v_1),ind(w_1))$. If a tuple $(ind(u_1),ind(v_2))$ is not found in the list of leaf $w_1$, there is no valid policy (except the reject policy) for the field set $(u \in u_1, v \in v_2, w \in w_1)$ and the search stops.

This procedure uses knowledge of the previous phases of the search more efficiently, and reduces thereby the memory requirements The above procedure can also be applied if instead of an exact match in subsequent trees a longest prefix match is required. If the policy that applies to the field tuple $(u \in u_1, v \in v_1, w \in w_1)$ is the same as for $(u \in u_1, v \in v_1, w \in \text{subset}(w_1))$ (but policies $(u \in u_1, v \in v_1, w \in \text{subset}(w_1))$ and $(u \in u_1, v \in v_2, w \in \text{subset}(w_1))$ are different), the following optimization can be made using the fact that backtracking in LPM is allowed. If the search for w ends in subset($w_1$) we search for the tuple $(ind(u_1),ind(v_1))$ in the list attached to leaf subset($w_1$). However, since w also belongs to $w_1$ and the associated policies are the same, it is sufficient to store the index tuple $(ind(u_1),ind(v_1))$ in the list of leaf $w_1$ provided a backtracking operation is performed and it is searched for the index tuple $(ind(u_1),ind(v_1))$ in the parent set of subset($w_1$), i.e. $w_1$. This optional memory optimization comes at the cost of modest lower performance due to the backtracking operation.

Assume that, in addition to the index, a set of logicals is defined in each leaf, say $(L_U,L_V,L_W,L_X,L_Y)$, and similarly in each list entry. Assume now that the policy that applies for the field tuple $(u \in u_1, v \in v_1, w \in w_1, x \in x_1, y \in y_1)$ is independent of the values of v, w, x and y, i.e. $P(u \in u_1, v \in v_1, w \in w_1, x \in x_1, y \in y_1) = P(u \in u_1,*,*,*,*)$. In this case, the logicals can be set to $(L_U,L_V,L_W,L_X,L_Y)=(T,F,F,F,F)$, where "T" denotes the binary value "true", and "F" denotes the binary value "false". This indicates that the subsequent trees V, W, X, and Y do not have to be searched, as the policy is sufficiently defined. A similar procedure can be applied for $P(*,v \in v_1,*,*,*)$. By masking the index $ind(u_1)$ (i.e., mapping to a default value $ind(u_0)$), all policies $P(u \in u_1, v \in v_1,*,*,*)=P(u \in u_2, v \in v_1,*,*,*)=P(*,v \in v_1,*,*,*)$ have only one entry. Since the end result is independent of the first result, the leaf logicals $(L_U,L_V,L_W,L_X,L_Y)$ are set to (F,T,F,F,F) which increases speed and reduces memory requirements as no list is required in the leaf $v_1$.

The same can be applied for policies of the type $P(u \in u_1, v \in v_1,*,*,*)$, $P(u \in u_1,*,w_1,*,*)$ or $P(u \in u_1,*,w_1,x_1,*)$ etc. For the policy $P(u \in u_1, v \in v_1,*,*,*)$ the logicals $(L_U,L_V,L_W,L_X,L_Y)$ of list entry $ind(u_1)$ of leaf $v_1$ are set to (T,T,F,F,F). The result of the search at this phase is the tuple $(ind(u_1),ind(v_1))$, and further searches are unnecessary. For the policy $P(u \in u_1,*,w \in w_1,*,*)$ the logicals $(L_U,L_V,L_W,L_X,L_Y)$ of list entry $(ind(u_1),ind(v_1))$ of leaf $w_1$ are set to (T,F,T,F,F). Index $ind(v1)$ is masked and the result of the complete search is the tuple $(ind(u_1),ind(v_0),ind(w_1))$. For the policy $P(u \in u_1,*,w \in w_1,*,*)$ the logicals $(L_U,L_V,L_W,L_X,L_Y)$ of list entry $(ind(u_1),ind(v_1))$ of leaf $w_1$ are set to (T,F,T,T,F) (as above), the result after searching the third tree is $(ind(u_1),ind(v_0),ind(w_1))$. The list of leaf $x_1$ has an entry $(ind(u_1),ind(v_0),ind(w_1))$, and the final result $(ind(u_1),ind(v_0),ind(w_1),ind(x_1))$. The procedure outlined in the previous steps can again be applied to the entry $(ind(u_1),ind(v_0),ind(w_1))$ of leaf $x_1$, resulting in e.g. a tuple value $(ind(u_1),ind(v_0),ind(w_0),ind(x_1))$.

In case the number of policies of the above type is large, both memory requirements and performance will improve considerable.

A further optimization can be obtained if a policy is sufficiently defined by either $ind(v1)$ or $ind(w1)$, i.e. $P(u \in u_1, v \in v_1,*,x \in x_1, y \in y_1)$ OR $P(u \in u_1,*,w \in w_1, x \in x_1, y \in y_1)$. This can be for example the case for HTTP applications, where either the source or destination port defines the flow as an HTTP-flow. A partial result bit $L_{prt}$ is defined, which is set to "T" in leaf $u_1$. In the list of $v_1$ the entry $ind(u1)$ the $L_{prt}$ is set to "F", $L_W=F$ and the search continues with the remaining fields x and y. If $v \notin v_1$, the field w has to be inspected. To prevent listing all possible tuples $(ind(u_1),ind(v_n) \neq ind(v_1))$ in the list of leaf $w_1$ which would map to the same policy $P(u \epsilon u_1, v \epsilon v_1, *, x \epsilon x_1, y \epsilon y_1) = P(u \epsilon u_1, *, w \epsilon w_1, x \epsilon x_1, y \epsilon y_1)$, listing the tuples $(ind(u_1), ind(v_n) \neq ind(v_1))$ is omitted in the list of leaf $w_1$. This results in a search failure (in case field w requires an exact match), but since $L_{prt}=T$, we accept the result and the policy is $P(u \epsilon u_1, *, w \epsilon w_1, x \epsilon x_1, y \epsilon y_1)$ ($=P(u \epsilon u_1, v \epsilon v_1, *, x \epsilon x_1, y \epsilon y_1)$). This reduces memory requirements of leaf $w_1$ and speeds up the search procedure.

In addition to the six logicals defined before, an additional logical $L_{rst}$ may be defined which is set as soon as the policy is completely defined. This logical is an extra verification of successful completion of the search rather than a further optimization.

In the present formulation there may still be cases in which two identical policies $P(u \epsilon u_1, v \epsilon v_1, w \epsilon w_1, x \epsilon x_1, y \epsilon y_1)$ and $P(u \epsilon u_2, v \epsilon v_1, w \epsilon w_1, x \epsilon x_1, y \epsilon y_1)$ have two entries $(ind(u_1), ind(v_1), ind(w_1), ind(x_1), ind(y_1))$ and $(ind(u_2), ind(v_1), ind(w_1), ind(x_1), ind(y_1))$. This can be prevented by mapping after each search the partial result (here: after tree V the tuples $(ind(u_1), ind(v_1))$ and $(ind(u_2), ind(v_1))$) onto one tuple value $(ind(u_1), ind(v_1))$. This reduces the number of list entries of subsequent trees even further.

For tree searches the following rules may be applied:
1. exact matches are commutative, i.e. $(EM(a), EM(b)) = (EM(b), EM(a))$
2. range matches are commutative, i.e. $(RM(a), RM(b)) = (RM(b), RM(a))$
3. an exact match and a range match are commutative, i.e. $(EM(a), RM(b)) = (RM(b), EM(a))$
4. an exact match and a longest prefix match are commutative, i.e. $(EM(a), LPM(b)) = (LPM(b), EM(a))$
5. A range match and a longest prefix match are commutative, i.e. $(RM(a), LPM(b)) = (LPM(b), RM(a))$
6. longest prefix matches are not commutative, i.e. $(LPM(a), LPM(b)) \neq (LPM(b), LPM(a))$
7. all matches are associative, i.e. $(xM(a), xM(b), xM(c)) = (xM(a), (xM(b), xM(c)))$ where x is either E (exact), R (range) or LP (longest prefix).

This allows to optimize the classification even further. The associative property permits the search to be executed in parallel. All optimizations can be used, except for the use of the partial result flag. This may be achieved e.g. by changing the order to protocol—source port—destination port—source address—destination address.

As regards the hardware implementation, the classification can be done as a series of longest prefix or exact matches to find a condition key for each of the selectors. The relevant selectors are the source address, destination address, the carried protocol and for certain protocols the source and destination port numbers.

An ACR (Algorithm Control Register) status register indicates which searches are needed and defines corresponding flag values. In the present case of five classification fields ($N_{fld}=5$), each of the possible 5 searches adds a N-bit index to the 5×N-(N may be different for different fields: here we assume N=8 for all classification fields) bit IKR (Index Key Register). The final search is done on the 5×N -bit IKR classification result search tree. The classification result search returns the classification result vector address. If any tree failures exist, an error flag status bit is set.

In the following, possible structures of the tree leaf data are described.

The 16-bit leaf data of the first tree may be arranged as indicated in Table 1.

TABLE 1

| Index | Index value of the search. |
|---|---|
| Logicals | $L_U$, $L_V$, $L_W$, $L_X$, $L_Y$, $L_{rst}$, $L_{prt}$<br>$L_U$ = Logical indicating if U-tree has to be searched, T: search, F: do not search<br>$L_V$ = Logical indicating if V-tree has to be searched. T: search, F: do not search<br>$L_W$ = Logical indicating if W-tree has to be searched. T: search, F: do not search<br>$L_X$ = Logical indicating it X-tree has to be searched. T: search, F: do not search<br>$L_Y$ = Logical indicating if Y-tree has to be searched. T: search, F: do not search<br>$L_{rst}$ = Logical if final result is obtained. T: yes, goto final tree; F: go to next tree<br>$L_{prt}$ = Partial result logical |

Furthermore, the 32-bit leaf data of the second to fifth tree may be arranged as indicated in Table 2.

TABLE 2

| Index | Index value of the search. |
|---|---|
| Logicals | $L_U$ = Logical indicating if U-tree has to be searched T: search, F: do not search<br>$L_V$ = Logical indicating if V-tree has to be searched. T: search, F: do not search<br>$L_W$ = Logical indicating if W-tree has to be searched. T: search, F: do not search<br>$L_X$ = Logical indicating if X-tree has to be searched. T: search, F: do not search<br>$L_Y$ = Logical indicating if Y-tree has to be searched. T: search, F: do not search<br>$L_{rst}$ = Logical if final result is obtained. T: yes, goto final tree: F: go to next tree<br>$L_{prt}$ = Partial result logical |
| ListAddr[15:0] | Pointer to list containing indices of previous searches. |

Additionally, the 16-bit leaf data of the final result tree may be arranged as indicated in Table 3.

TABLE 3

| ResultAddress] | Address of action to be applied to the classified packet (policy action) |
|---|---|

Figure 2:
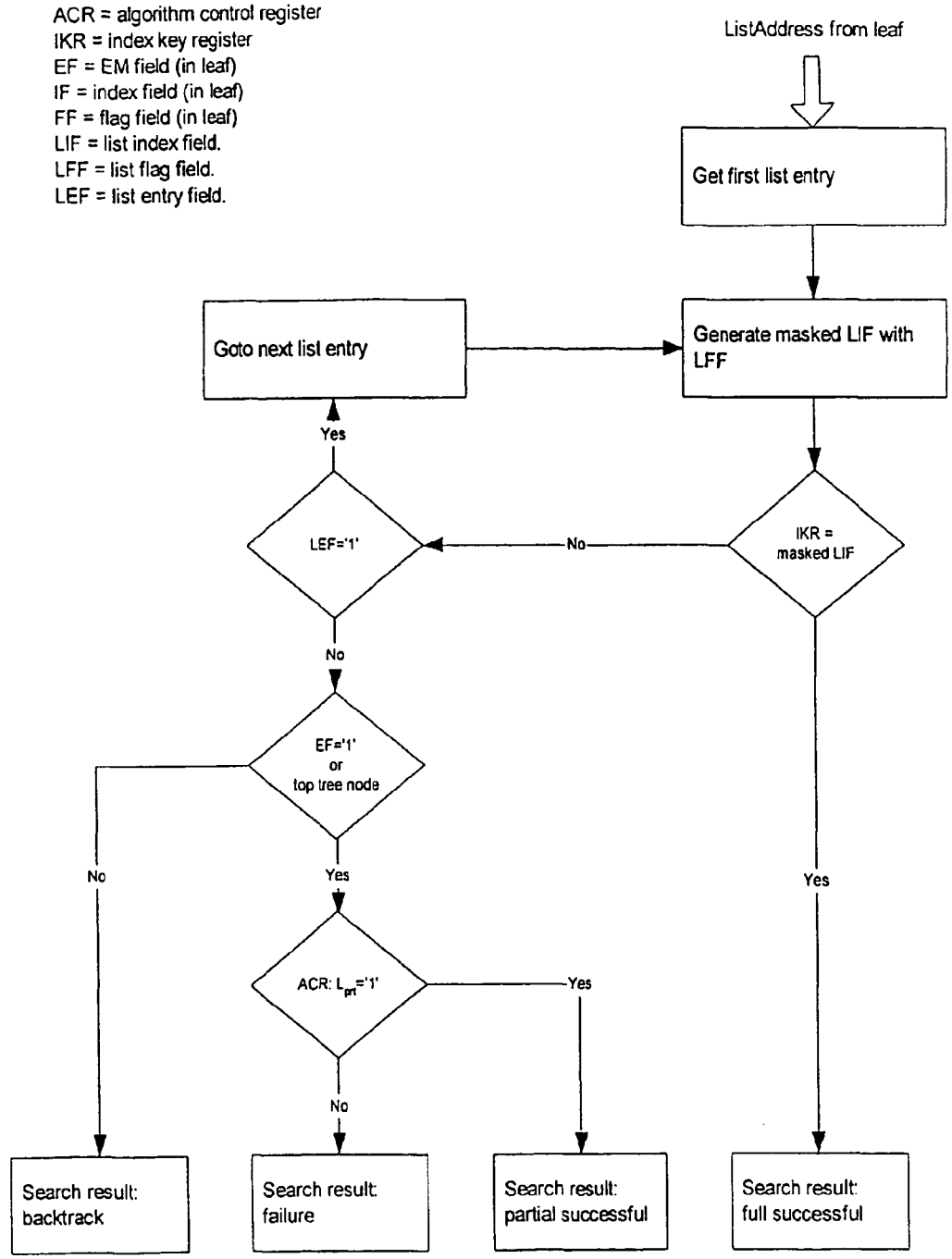
FIG. 2 shows a flow diagram of a list search procedure according to the preferred embodiment.

FIG. 2 shows a flow diagram of a list search procedure according to the preferred embodiment.

All list searches may be done by a linear search. Based on a list address from the leaf, a first list entry is obtained. Then, a masked list index field (LIF) is generated using the list flag field (LFF). The flags of the LFF can be used to mask any byte of the index of the LIF from being compared to the IKR (Index Key Register). The masked value of List index field is then compared to the 40-bit IKR starting from the MSB of the IKR. If the masked LIF is identical with the content of the IKR, a fully successful search result is indicated. If it is not identical, the list entry field (LEF) is checked. If the LEF is "1", the next list entry is processed. If the LEF is "0", the Exact Match (EM) field (EF) in the leaf is checked. If it is "1" or the concerned node is a top tree node, the $L_{prt}$ is checked in the ACR. If $L_{prt}$="1", a partially successful search result is indicated. On the other hand, if $L_{prt}$="0", a failure is indicated as the search result. If the EF is "0" and the concerned node is not a top tree node, backtrack is indicated as the search result. The above lists can be stored in a search tree memory in continuous byte memory locations.

There may be the following four types of list searches provided:

i) a $2^{nd}$ list search (i.e. list search done during $2^{nd}$ tree search) may be done with a list structure as shown in Table 4.

TABLE 4

| Index key register (IKR) | Bits[39:32] | Bits[31:24] | Bits[23:16] | Bits[15:8] | Bits[7:0] |
|---|---|---|---|---|---|
| List Index | Index from search in U-tree | 0 | 0 | 0 | 0 |
| List Flag (for mask) | $L_U$ | $L_V$ | $L_W$ | $L_X$ | $L_Y$ | ii) a $3^{rd}$ list search (i.e. list search done during $3^{rd}$ tree search) may be done with a list structure as shown in Table 5.

TABLE 5

| Index key register | Bits[39:32] | Bits[31:24] | Bits[23:16] | Bits[15:8] | Bits[7:0] |
|---|---|---|---|---|---|
| List Index | Index from search in U-tree | Index from search in V-tree | 0 | 0 | 0 |
| List Flag (for mask) | Flags[6] | Flags[5] | Flags[4] | Flags[3] | Flags[2] | iii) a $4^{th}$ list search (i.e. list search done during $4^{th}$ tree search) may be done with a list structure as shown in Table 6.

TABLE 6

| Index key register | Bits (5N-1..4N) | Bits (4N-1..3N) | Bits (3N-1..2N) | Bits (2N-1..N) | Bits (N-1..0) |
|---|---|---|---|---|---|
| List Index | Index from search in U-tree | Index from search in V-tree | Index from search in W-tree | 0 | 0 |
| List Flag (for mask) | Flags[6] | Flags[5] | Flags[4] | Flags[3] | Flags[2] | iv) a $5^{th}$ list search (i.e. list search done during $5^{th}$ tree search) may be done with a list structure as shown in Table 7.

TABLE 7

| Index key register | Bits (5N-1..4N) | Bits (4N-1..3N) | Bits (3N-1..2N) | Bits (2N-1..N) | Bits (N-1..0) |
|---|---|---|---|---|---|
| List Index | Index from search in U-tree | Index from search in V-tree | Index from search in W-tree | Index from search in X-tree Index[7:0] | 0 |
| List Flag (for mask) | Flags[6] | Flags[5] | Flags[4] | Flags[3] | Flags[2] |

Table 8 shows an example for a list and a corresponding list search.

TABLE 8

| Entry | List Flag[6:2] | List Index[15:0] (=3rd list search) | Index Key Register(=12AB000000) |
|---|---|---|---|
| '1' | "11000" | 0x10A0 | 0x10A0xxxxxx ≠ 0x12ABxxxxxx |
| '1' | "11000" | 0x11AB | 0x11ABxxxxxx ≠ 0x12ABxxxxxx |
| '1' | "10000" | 0x1000 | 0x10xxxxxxxx ≠ 0x12xxxxxxxx |
| '0' (=Last entry of list) | "01000" | 0x00AB | 0xxABxxxxxx = 0xxABxxxxxx (Match found!) |

In the example shown in Table 8, a hexadecimal value "12AB000000" is contained in the IKR, wherein the hexadecimal values "A" to "F" correspond to the bit patterns or tuples "1010" to "1111", respectively. Thus, the 40-bit IKR contains the bit patterns "0001 0010 1010 1011 0000 0000 0000 0000 0000 0000". The List Index is selected according to the 3$^{rd}$ tree search, i.e. The index bit pattern comprises bits 0 to 15 (16 bits). This List Index is masked with the List Flag (bits 6 to 2), wherein each bit of the List Flag can be used for masking a corresponding bit pattern of 8 bits of the List Index. In the upper three rows of Table 8, the result of the comparison of the masked List Index with the IKR does not lead to a match, while in the case of the last table row a match between the List Index and the IKR is found.

Figure 3:
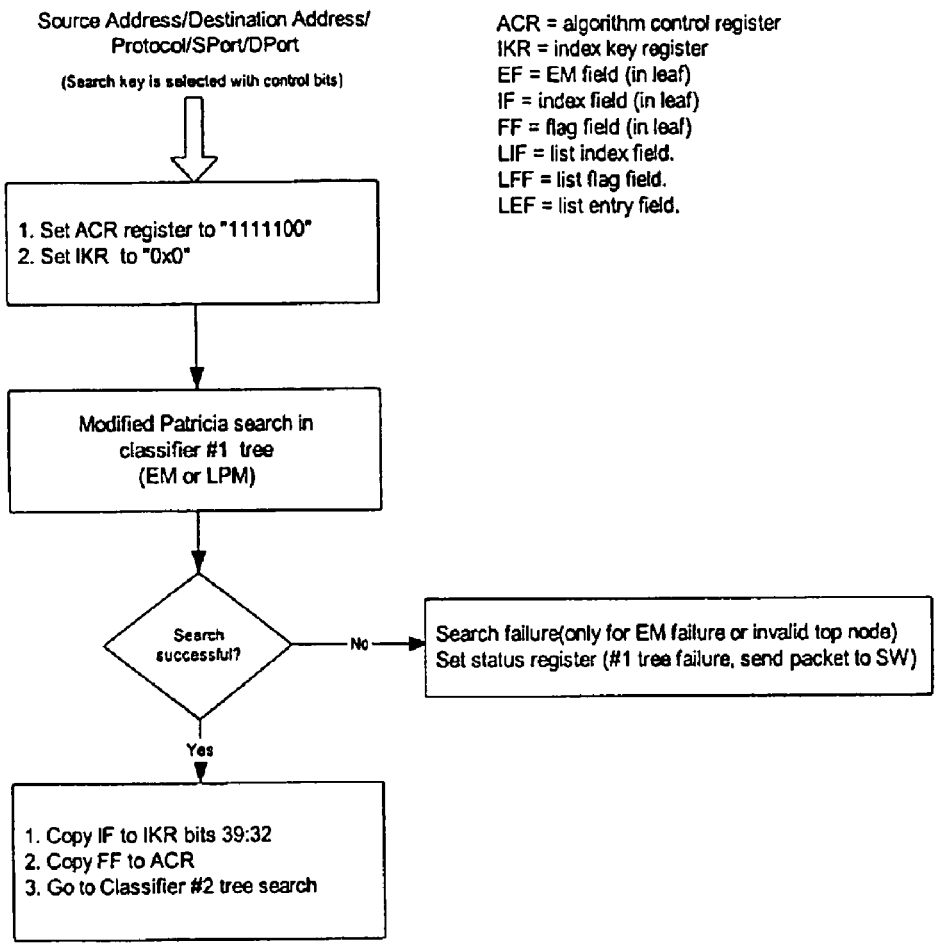
FIG. 3 shows a flow diagram of a search operation in the first search tree according to the preferred embodiment.

FIG. 3 shows a flow diagram of a procedure corresponding to a 1$^{st}$ classifier tree search of the classification algorithm. This algorithm is straightforward because there is no list search present. If match is not found in LPM case the index value is set to zero (i.e. IKR bits 5N-1 . . . 4N are set to zero). If the search was an Exact Match (EM) case and there was no match, the search fails. There are control flags that selects which of the five possible search keys is used in the 1$^{st}$ search (e.g. source address (SA), destination address (DA), protocol, source port number or destination port number). This selection may be done with a control register. According to FIG. 3, the search key is selected with the control bits of the control register. If the selection indicates a 1$^{st}$ tree search, the ACR is set to "1111100" and the IKR is set to zero, i.e. "0x0". Then, a modified Patricia search is performed in the classifier U-tree. If the search was not successful, the status register is set to #1 tree failure. Furthermore, a search failure may indicated, preferably only an EM failure or an invalid top node. If the search was successful, the Index Field is copied to the IKR bits 5N-1 . . . 4N, the Flag Field is copied to the ACR, and the procedure moves on to the classifier #2 tree search (2$^{nd}$ tree).

Figure 4:
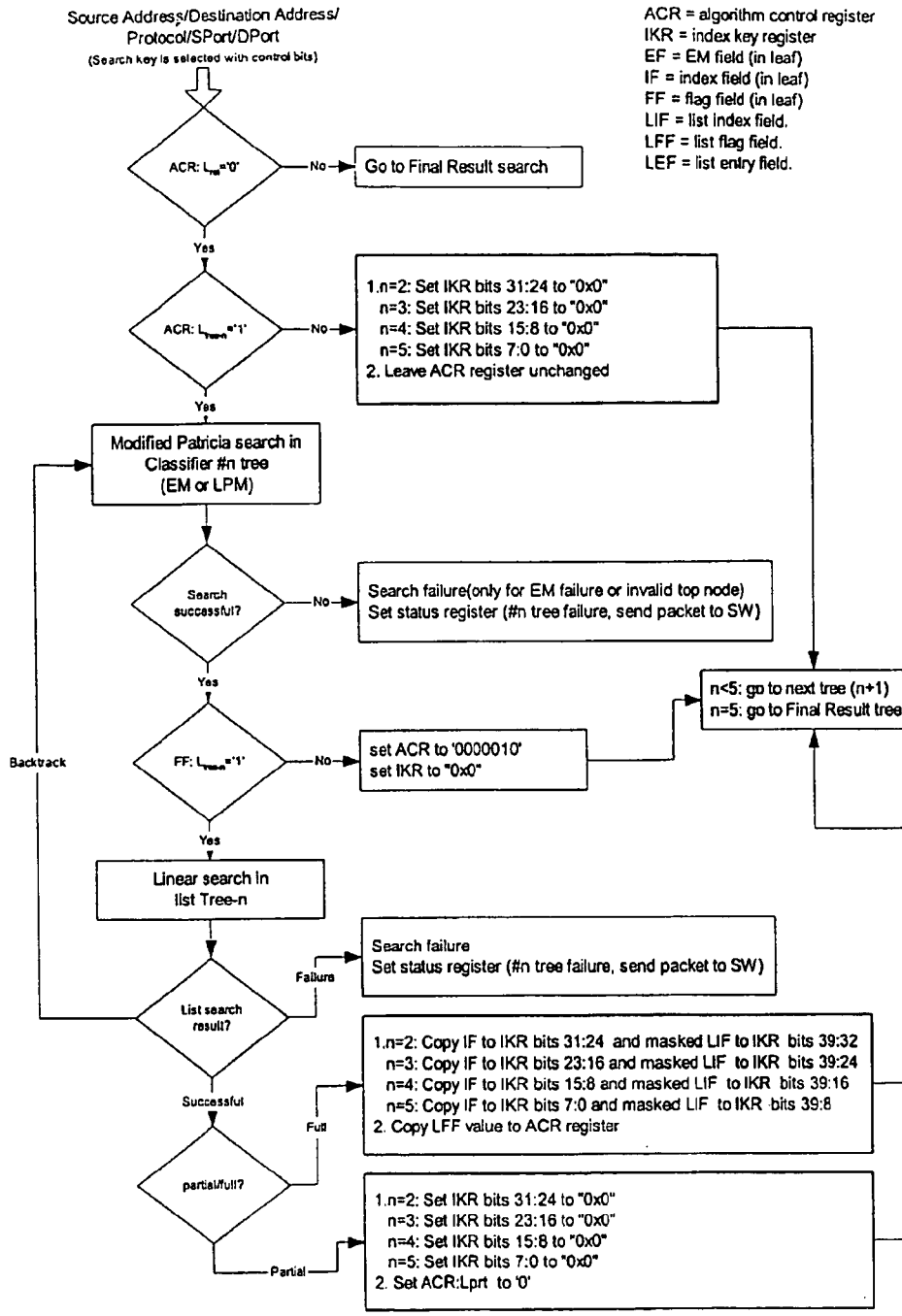
FIG. 4 shows a flow diagram of a search operation in the second to fifth search tree according to the preferred embodiment.

FIG. 4 shows a flow diagram indicating a procedure corresponding to the 2$^{nd}$, 3$^{rd}$, 4$^{th}$ and 5$^{th}$ search tree part of the classification, which is more complicated. First a normal search is done in the search tree and if match is found the linear list search is done in list which start address was returned as search result during tree search. There are control bits that select which of the five possible search keys is used in the search (e.g. source address (SA), destination address (DA), protocol, source port or destination port). This selection may be done with control registers. Initially, based on the bits of the ACR, a final result search or a modified Patricia search in a selected one (#n) of the search trees is initiated, while the ACR register is not changed in the latter case. If the search was not successful, a search failure is indicated, only for EM failure or an invalid top node, the status register is set to a #n tree failure. If the search was successful, the flag L$_{tree-n}$ of the corresponding tree is checked. If it is set to "1", a linear search according to FIG. 2 is performed in the list of the n$^{th}$ tree. If the flag is set to "0", the ACR is set to "0000010", the IKR is set to "0x0" and the flow proceeds to the next (i.e. (n+1)$^{th}$) tree if n<5. If n=5, the final result search is selected.

Based on the result of the linear search in the list (i.e. list search), the procedure branches to the modified Patricia search if a backtrack is determined, indicates a search failure, copies the Index Field and masked List Index Field to the respective IKR bits and the List Flag Field to the ACR register if the search was fully successful, or sets the respective IKR bits to "0x0" and the L$_{prt}$ bit of the ACR to "0" if the search was only partially successful.

Figure 5:
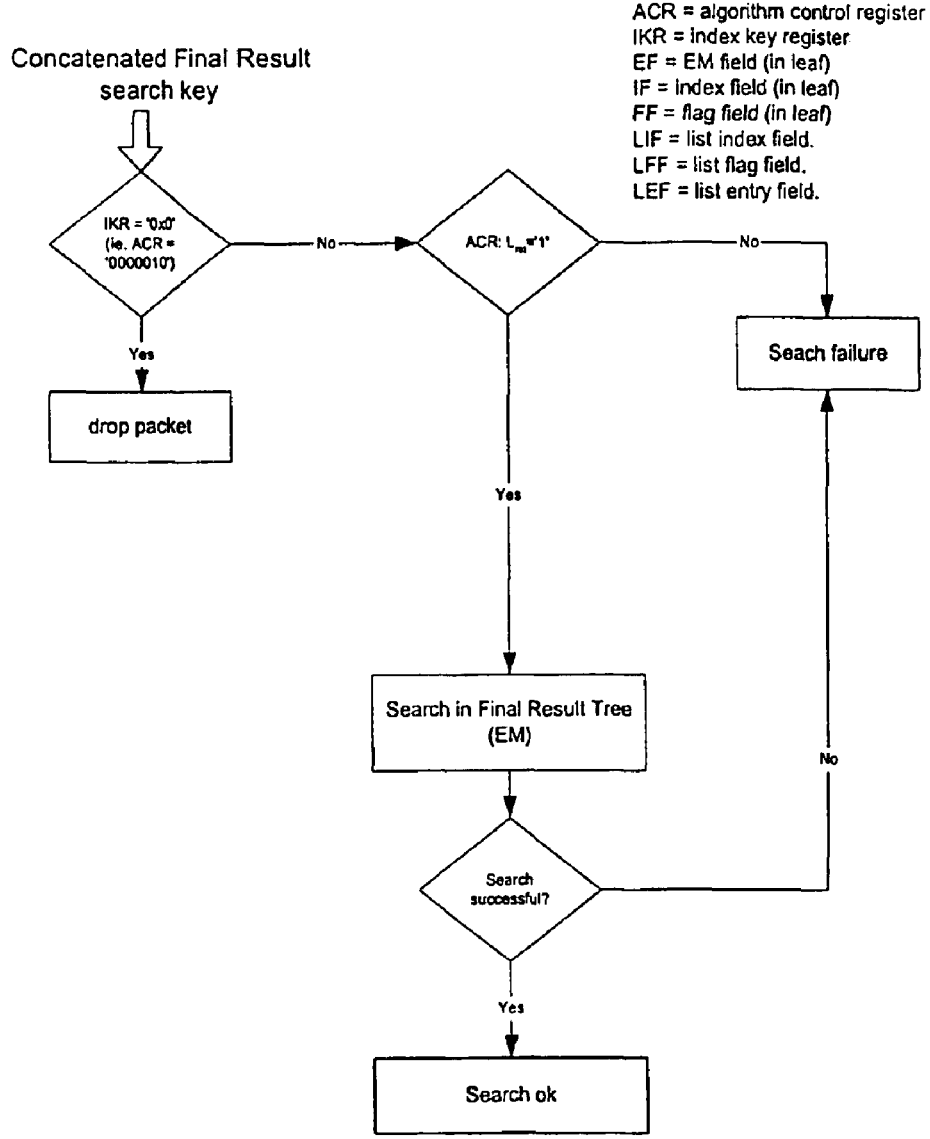
FIG. 5 shows a flow diagram of a search operation in the final result search tree according to the preferred embodiment.

FIG. 5 shows a flow diagram of a procedure according to the final result search which is done after restructuring of the IKR is ready (i.e. after all or some of the possible classifier tree #1-5 searches have been done). Final result search is an exact match search. Out, is not relevant for the invention According to FIG. 5, a check is initially performed as to whether the IKR is set to zero, i.e. The ACR is set to "0000010". If so, the status register is set correspondingly and the packet is dropped. Otherwise, the L$_{rst}$ bit of the ACR is checked. If it is not set to "1", a search failure is determined and the status register is set correspondingly, i.e. final tree failure.

IPSec part is not relevant for the invention. Hence, in FIG. 5 everything after the diamond "Search oke" is to be scrapped.

It is noted that the present invention is not restricted to the specific features of the above preferred embodiments, but can be applied to any classification in a classifier or forwarder (i.e. 1-dimensional classifier) of any area of application of data strings where classification on a number of classification fields each comprising at least one bit of the data strings is required Thus, the present invention may vary within the scope of the attached claims.

The invention claimed is:

1. A method for classifying a binary string, comprising:
searching for a plurality of classification fields for said binary string in respective search trees based on a matching procedure in which an index value is obtained in a leaf node of a respective search tree for each classification field found during said searching;
deriving from index values obtained in said searching a policy configured to be applied to said binary string;
reducing a number of index values by combining intermediate results of said searching or said deriving and mapping the number of index values onto one value by use of a knowledge of searches;
incorporating said one value into said knowledge of searches to use said one value during a next search;
storing an index value of a first classification field in a list attached to the leaf node of a second classification field, when a policy exists for a combination of the index values of said first and second classification fields;
searching for said index value of said first classification field in said list attached to said leaf node of said second classification field when the search for said second classification field has reached said leaf node of said second classification field,
deriving a classification for the binary string, and
outputting the classification.

2. The method according to claim 1, wherein said binary string is the data packet.

3. The method according to claim 1, wherein said combining is performed by merging filter functions used in said deriving.

4. The method according to claim 1, wherein said combining is performed based on wild cards contained in said policy.

5. The method according to claim 1, wherein said deriving is performed by concatenating said index values and applying a hashing procedure to said concatenated index values.

6. The method according to claim 5, wherein said combining is performed by allocating same index values to leaf nodes resulting in the same policy.

7. The method according to claim 1, further comprising:
searching for an index value of a classification field in a list attached to a leaf node of a subset of said classification field, when the search for said classification field ends in said subset of said classification field.

8. The method according to claim 1, further comprising:
performing a backtracking operation from a subset to a parent set of a classification field when the search for said classification field ends in said subset.

9. The method according to claim 1, further comprising:
defining a set of logicals in each leaf node and/or list entry of a list attached to a leaf node; and
using said logicals to selectively mask individual index values.

10. The method according to claim 1, further comprising:
adding a partial result bit to an index value allocated to a leaf node; and
deciding on the acceptance of a partial matching result based on the value of said partial result bit.

11. The method according to claim 1, further comprising:
setting a logical value when said policy is completely defined.

12. The method according to claim 1, further comprising:
mapping, after each search operation of a search tree, partial results onto one index tuple value.

13. The method according to claim 1, wherein said searching is performed in parallel for said plurality of classification fields.

14. The method according to claim 1, further comprising:
implementing said method in at least one of a sequential code or a parallel code.

15. A software program product, embodied on a computer-readable medium, for executing a method for classifying a binary string when run on a data processing system, the method comprising:
searching for a plurality of classification fields for said binary string in respective search trees based on a matching procedure in which an index value is obtained in a leaf node of a respective search tree for each classification field found during said searching;
deriving from index values obtained in said searching a policy configured to be applied to said binary string;
reducing a number of index values by combining intermediate results of said searching or said deriving and mapping the number of index values onto one value by use of a knowledge of searches;
incorporating said one value into said knowledge of searches to use said one value during a next search;
storing an index value of a first classification field in a list attached to the leaf node of a second classification field, when a policy exists for a combination of the index values of said first and second classification fields;
searching for said index value of said first classification field in said list attached to said leaf node of said second classification field when the search for said second classification field has reached said leaf node of said second classification field,
deriving a classification for the binary string, and
outputting the classification.

16. A hardware implementation of a program for executing a method for classifying a binary string when run on a data processing system, the method comprising:
searching for a plurality of classification fields for said binary string in respective search trees based on a matching procedure in which an index value is obtained in a leaf node of a respective search tree for each classification field found during said searching;
deriving from index values obtained in said searching a policy configured to be applied to said binary string;
reducing the number of index values by combining intermediate results of said searching or said deriving and mapping the number of index values onto one value by use of a knowledge of searches;
incorporating said one value into said knowledge of searches to use said one value during a next search;
storing an index value of a first classification field in a list attached to the leaf node of a second classification field, when a policy exists for a combination of the index values of said first and second classification fields;
searching for said index value of said first classification field in said list attached to said leaf node of said second classification field when the search for said second classification field has reached said leaf node of said second classification field,
deriving a classification for the binary string, and
outputting the classification.

17. A network element, comprising:
search means for searching for a plurality of classification fields for a binary string in respective search trees based on a matching procedure in which an index value is obtained in a leaf node of a respective search tree for each classification field found during said searching;
derivation means for deriving from index values obtained by said search means a policy configured to be applied to said binary string; and
reduction means for reducing a number of index values by combining intermediate results of said search means or said derivation means and for mapping the number of index values onto one value by use of a knowledge of searches;
incorporation means for incorporating said one value into said knowledge of searches to use said one value during a next search;
storage means for storing an index value of a first classification field in a list attached to the leaf node of a second classification field, when a policy exists for a combination of the index values of said first and second classification fields; and
search means for searching for said index value of said first classification field in said list attached to said leaf node of said second classification field when the search for said second classification field has reached said leaf node of said second classification field,
wherein the network element is configured to classify said binary string, which is configured to be represented by at least one classification field.

18. A network element, comprising:
a search unit configured to search for a plurality of classification fields for a binary string in respective search trees based on a matching procedure in which an index value is obtained in a leaf node of a respective search tree for each classification field found during said search;

a derivation unit configured to derive from index values obtained in said search a policy configured to be applied to said binary string; and a reduction unit configured to reduce the number of index values by combining intermediate results of said searching or deriving and to map the number of index values onto one value by use of a knowledge of searches;

an incorporation unit configured to incorporate said one value into said knowledge of searches to use said one value during a next search;

a storage unit configured to store an index value of a first classification field in a list attached to the leaf node of a second classification field, when a policy exists for a combination of the index values of said first and second classification fields; and a search unit configured to search for said index value of said first classification field in said list attached to said leaf node of said second classification field when the search for said second classification field has reached said leaf node of said second classification field, wherein said network element is configured to classify said binary string, which is configured to be represented by at least one classification field.

19. The network element according to claim 18, further comprising:

a status register configured to indicate required searches based on corresponding flag values.

20. The network element according to claim 18, further comprising:

an index key register configured to store index values of each possible search.

21. The network element according to claim 20, wherein said network element is configured to perform a final search by concatenating said index key register and possible other values.

22. The network element according to claim 18, wherein said network element is an internet protocol router.

* * * * *